(12) United States Patent
Monopoli et al.

(10) Patent No.: US 8,286,762 B2
(45) Date of Patent: Oct. 16, 2012

(54) DRUM BRAKES

(75) Inventors: Marco Monopoli, Millesimo (IT);
Daniele Giordano, Giusvalla (IT)

(73) Assignee: Automotive Products Italia (SV) s.r.l. (IT)

( * ) Notice: Subject to any disclaimer, the term of this patent is extended or adjusted under 35 U.S.C. 154(b) by 0 days.

(21) Appl. No.: 12/668,487

(22) PCT Filed: Jul. 16, 2008

(86) PCT No.: PCT/IB2008/002601
§ 371 (c)(1), (2), (4) Date: Jan. 11, 2010

(87) PCT Pub. No.: WO2009/010873
PCT Pub. Date: Jan. 22, 2009

(65) Prior Publication Data
US 2010/0282548 A1    Nov. 11, 2010

(30) Foreign Application Priority Data
Jul. 19, 2007 (GB) .................. 0714056.9

(51) Int. Cl.
*F16D 65/08* (2006.01)
(52) U.S. Cl. ............. 188/205 A; 188/206 R; 188/250 E

(58) Field of Classification Search .............. 188/106 A, 188/106 F, 206 R, 205 A, 218 A, 250 E
See application file for complete search history.

(56) References Cited

U.S. PATENT DOCUMENTS

| | | | |
|---|---|---|---|
| 2,532,086 A | * | 11/1950 | Chapman et al. ......... 188/218 A |
| 5,887,686 A | | 3/1999 | Tanaka et al. |

FOREIGN PATENT DOCUMENTS

| | | |
|---|---|---|
| EP | 0092470 A1 | 10/1983 |
| EP | 0538909 A2 | 4/1993 |

* cited by examiner

*Primary Examiner* — Christopher Schwartz
(74) *Attorney, Agent, or Firm* — RatnerPrestia

(57) ABSTRACT

A drum brake backplate having a vibration damping mass secured thereto. One or more portions of the mass are secured to the backplate and the remainder of the mass is spaced from the backplate and defines one or more further portions which are tuned to vibrate relative to the backplate at a frequency which reduces the noise generated by one or more a target frequencies (or range of frequencies) of the backplate. The mass may be in the form of an elongate rod or strip member of arcuate form which is secured to the backplate at one or more locations adjacent the rim of the backplate. This can be effective in reducing noise which emanates from the vibration of the backplate in a region adjacent a hydraulic actuating cylinder of the brake.

11 Claims, 5 Drawing Sheets

DRUM BRAKES

CROSS REFERENCE TO RELATED APPLICATIONS

This application is the U.S. national phase application of PCT International Application No. PCT/IB2008/002601, filed Jul. 16, 2008, which claims priority to Great Britain Application No. 0714056.9, filed Jul. 19, 2007, the content of such applications being incorporated by reference herein.

FIELD OF THE INVENTION

This invention relates to drum brakes and in particular to arrangements for damping the vibration of the backplates of drum brakes on which the brake shoes and shoe actuating devices are mounted.

BACKGROUND OF THE INVENTION

Problems often arise due to noise caused by the vibration of parts of the drum brake during braking. This vibration leads to unacceptable noise.

SUMMARY OF THE INVENTION

It is an object of the present invention to provide an arrangement for damping backplate vibration which at least mitigates the above noise problem.

Thus in accordance with the present invention there is provided a drum brake backplate having a vibration damping mass secured thereto, one or more portions of the mass being secured to the backplate and the remainder of the mass being spaced from the backplate and defining one or more further portions which are tuned to vibrate relative to the backplate at a frequency which reduces the noise generated by one or more a target frequencies (or range of frequencies) of the backplate.

In a preferred arrangement the damping mass may comprise a metal rod which is secured at its end regions to the backplate and spaced from the backplate between the end regions in order to be able to vibrate relative to the backplate.

As will be appreciated the length and cross section of the rod and the mechanical characteristics of the metal are all chosen to produce a first natural frequency of the vibration of the rod which generates a vibration which tends to counter the target frequency of vibration of the backplate.

The damping mass may be secured to the backplate in a region adjacent the area of attachment of a hydraulic actuating cylinder. Conveniently the mass may be of arcuate form which is secured to the backplate at one or more locations adjacent the rim of the backplate.

The invention also provides a method of designing a drum brake backplate to reducing the noise generated by the vibration of the backplate, the method comprising determining a target frequency of vibration of the backplate which is to be addressed, and designing a single piece mass which is to be attached to the backplate at one or more locations and to be spaced from the backplate at other locations so that it can vibrate relative to the backplate at a first natural frequency which corresponds to the target frequency to reduce the noise generated by the backplate.

BRIEF DESCRIPTION OF THE DRAWINGS

One embodiment of the present invention will now be described, by way of example only, with reference to the accompanying drawings in which.

DETAILED DESCRIPTION OF THE PREFERRED EMBODIMENTS

Figure 1:
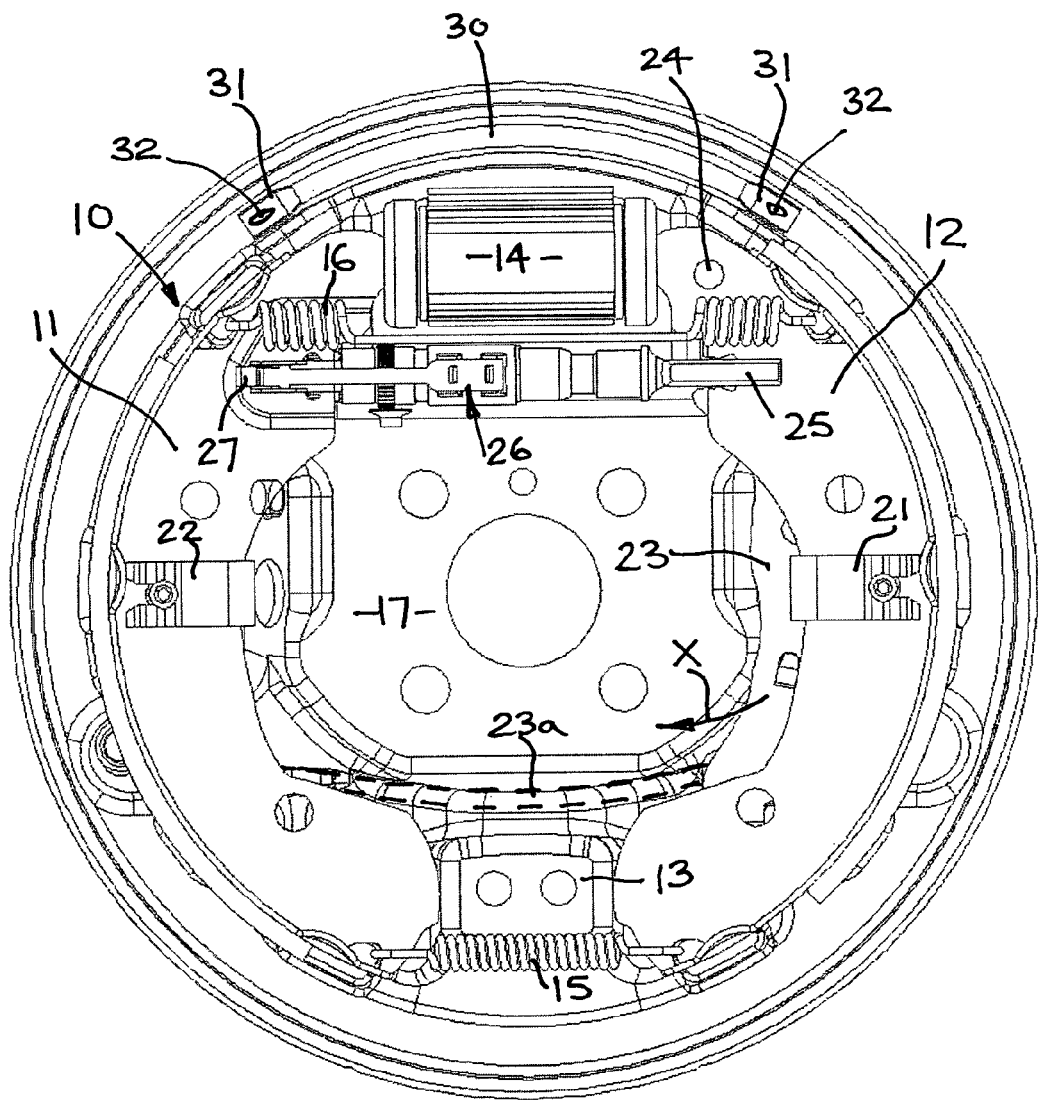
FIG. 1 is a plan of a vehicle drum brake embodying a backplate in accordance with aspects of the invention.

Referring to FIG. 1, this shows a drum brake 10 having a pair of brake shoes 11, 12 which at their lower ends react against a fixed abutment 13 and at their upper ends are forced apart by an hydraulic wheel cylinder 14. The shoes are kept in contact with the abutment 13 by a lower return spring 15 and in contact with the wheel cylinder 14 by an upper return spring 16.

Thus during normal service operation the shoes are brought into contact with the inner surface of a brake drum (not shown) in the conventional manner by actuating wheel cylinder 14 whose pistons (not shown) respectively outwardly displace the contacting ends of shoes 11 and 12 to engage the drum. In the conventional manner the two shoes are held down onto a back plate 17 by hold down clips 21 and 22 respectively.

The drum brake is also provided with a handbrake operating lever 23 pivoted at 24 on brake shoe 12. The hand brake operating lever contacts the right hand end element 25 of an adjuster strut 26 whose left hand end element 27 contacts the other brake shoe 11. In conventional manner if, for example, the handbrake lever 23 is pivoted on pivot 24 in a clockwise sense as viewed in FIG. 1 (see arrow X) by a cable (shown by dotted detail 23*a*) the handbrake lever will push the end element 25 of adjuster strut 26 to the left thus pushing the brake shoe 11 to the left. This in effect causes the two brake shoes 11 and 12 to move apart relative to each other and hence engage the inner surface of the brake drum thus applying the hand brake.

In the known manner the adjuster strut 26 automatically increases its effective length as the friction material of the shoes 11 and 12 wears. Any form of auto adjuster strut may be used, for example, a suitable form of adjuster strut is disclosed and claimed in the Applicant's European patent EP-B-0538909 or the Applicant's UK patent application No. 0705002.4, which are incorporated by reference.

In accordance with the present invention, the back plate 17 is provided with a damping mass 30 which has flattened end regions 31 which are riveted or otherwise secured (e.g. by spot welding or gluing) to the backplate at 32.

Figure 3:
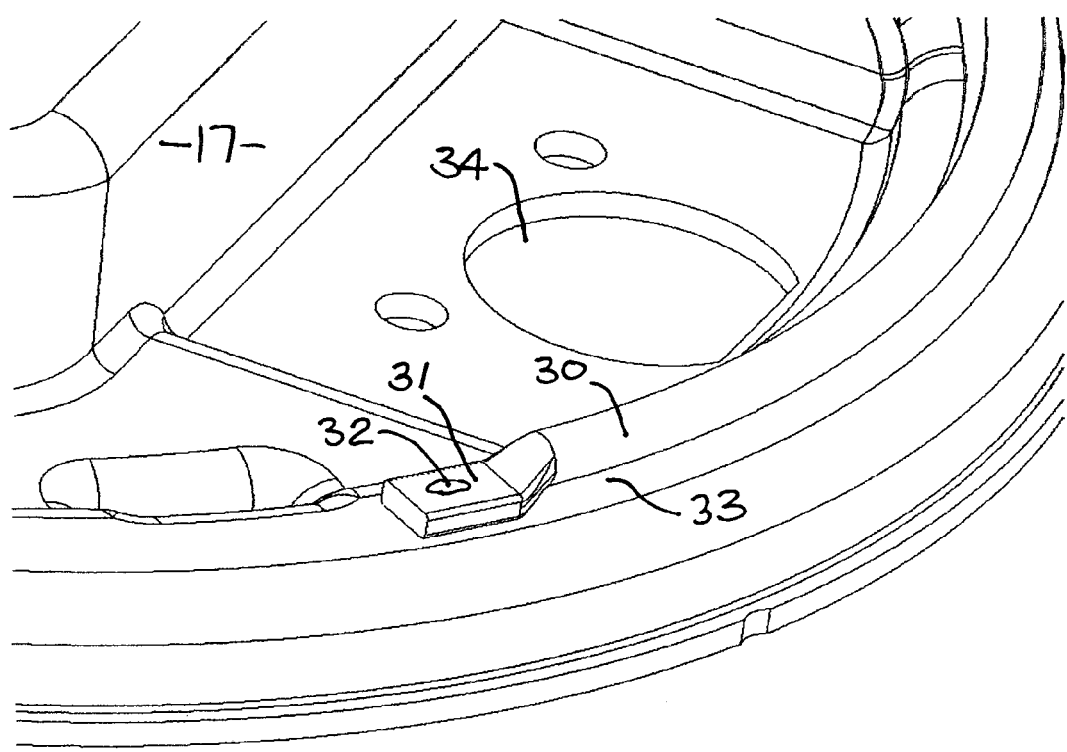
FIG. 3 is a perspective side view of part of the backplate of FIG. 2 showing the damper in more detail.

As best shown in FIG. 3, between the end portions 31 the damping mass is spaced from the backplate by a clearance 33 so that the damping mass can vibrate relative to the backplate.

In the particular backplate application under description it was found that the area of the backplate surrounding the attachment of the hydraulic cylinder 14 was generating a high frequency fifth mode vibration of the order of 1200 Hz and thus the damping mass 30 was designed to have a first natural frequency of vibration of approximately 1200 Hz in order to reduce the effects of this target frequency of vibration of the backplate.

It was found that the installation of the damping mass significantly reduced the number of occurrences of noise at levels above 70 dbA when the brake was applied. For example, before the damping mass was fitted, there were nearly 200 occurrences of noise at 70 dbA or above and this was reduced to 75 occurrences after the damping mass was fitted. Also the maximum noise level fell from 89 to 85 dbA and vibration amplitude was significantly reduced.

Conveniently the damping mass is made of steel rod on which the flat end portions 31 are formed. In the particular application under description, the mass is of arcuate form and the circumferential extent of the damping mass 30 is approximately 86 degrees and the diameter of the rod material from which the damping mass is manufactured is 5 mm. This enables the mass to be secured to the backplate adjacent the rim and in the general area of the backplate where the vibration is originating.

As will be appreciated, the length of the damping mass 30, it's cross section and the mechanical characteristics of the metal from which the mass is made are all chosen to insure that the first natural frequency of vibration of the mass matches the target frequency (1200 Hz) which the damping mass is trying to eliminate.

It is envisaged, for example, that additional similarly shaped damping masses could be used below the brake shoe abutment 13 or at other locations around the backplate.

To cover a larger frequency range, we can add two or more masses tuned at spaced frequencies. For example, we can design a first mass with a first natural frequency at 1200 Hz and a second mass with a first natural frequency at 1300 Hz. In this way we can cover a frequency range of 1150 to 1350 Hz.

FIGS. 4 to 9 show diagrammatically different mass damper arrangements for tuning out one or more frequencies or ranges of frequencies.

Figure 4:
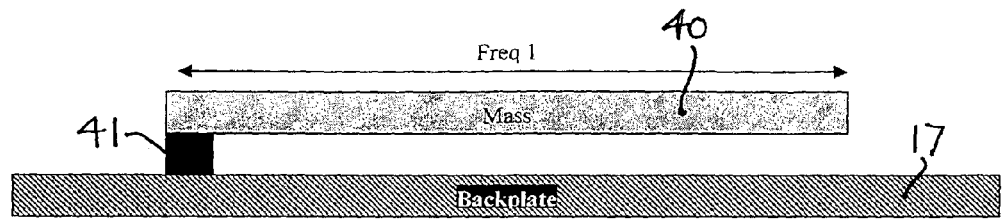
FIGS. 4 to 9 show diagrammatically different damping arrangements in accordance with aspects of the present invention.

FIG. 4 shows a single body 40 which is secured to the backplate 17 at a single location 41 at one end of the body. The body 40 is tuned to vibrate at a first natural frequency of say 1200 Hz to target the 1200 Hz vibration of the backplate.

Figure 5:
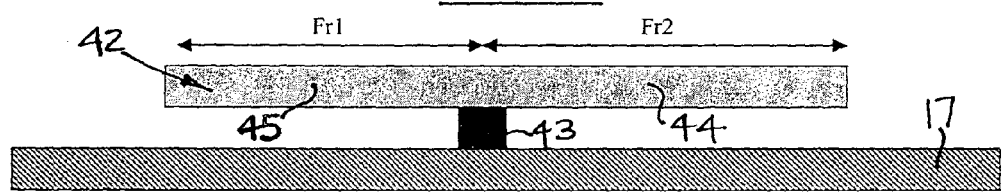

FIG. 5 shows a single body 42 which is secured to the backplate 17 at a single location 43 between the ends of the body. Portions 44 and 45 on either side of attachment location 43 are tuned to vibrate at two different first natural frequencies to target different vibration frequencies (or a range of frequencies) of the backplate.

Figure 2:
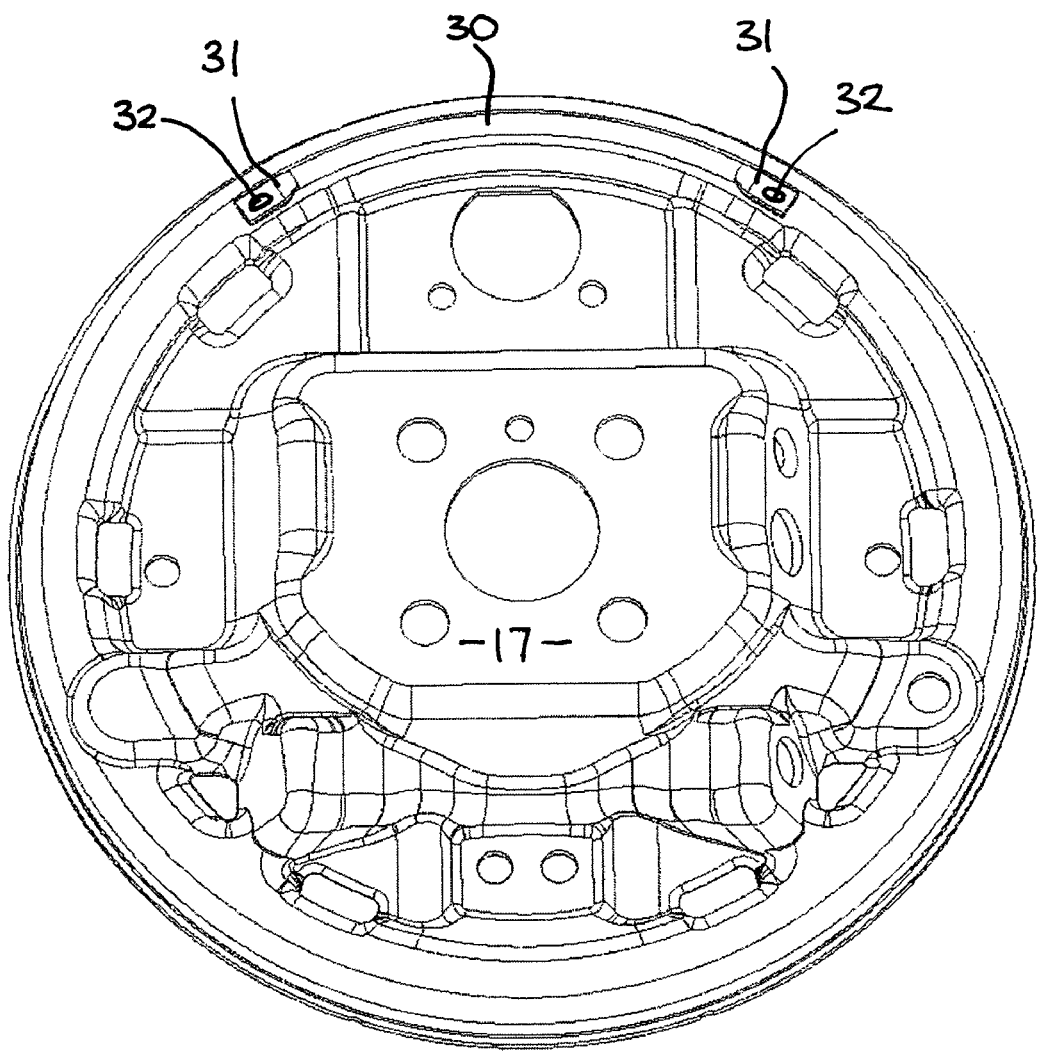
FIG. 2 is a perspective view of the backplate of the brake of FIG. 1, showing the damper of the present invention.
Figure 6:
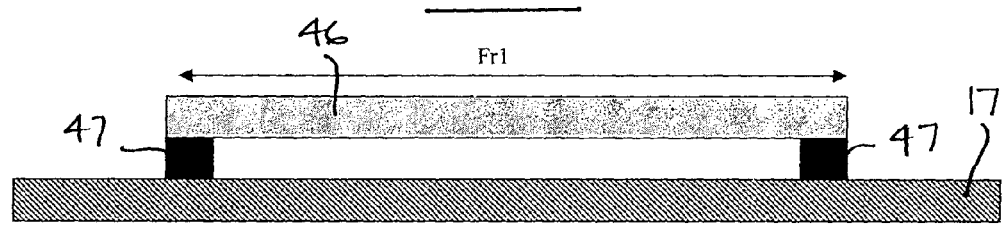

FIG. 6 shows the arrangement of FIGS. 1 to 3 in which a single body 46 which is secured to the backplate 17 at its ends 47 and is tuned to vibrate at a first natural frequency to target a single frequency of vibration of the backplate.

Figure 7:
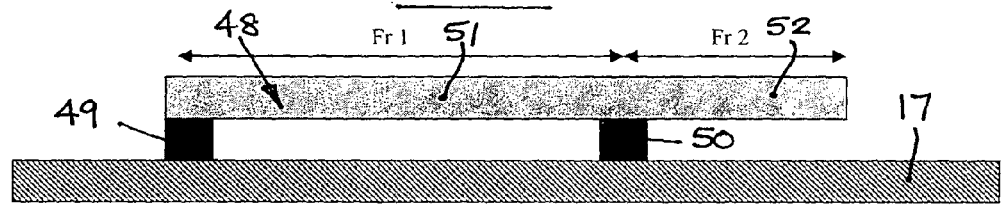

FIG. 7 shows a single body 48 which is secured to the backplate 17 at a two locations 49 and 50, one at an end of the body and the other between the ends. The portions 51 and 52 of body 48 is tuned to vibrate at two different first natural frequencies to target different vibration frequencies (or a range of frequencies) of the backplate.

Figure 8:
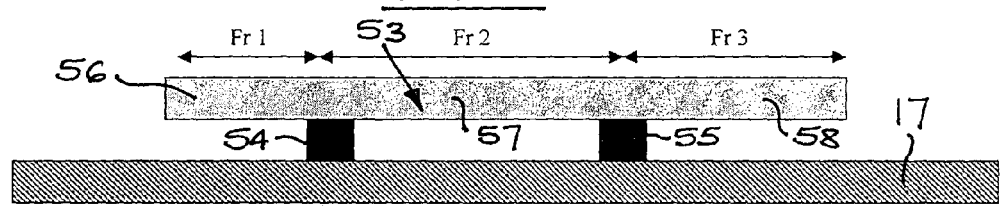

FIG. 8 shows a single body 53 which is secured to the backplate 17 at two locations 54 and 55 located between the ends of the body. The portions 56, 57 and 58 of body 53 are tuned to vibrate at three different first natural frequencies to target different vibration frequencies (or a range of frequencies) of the backplate.

Figure 9:
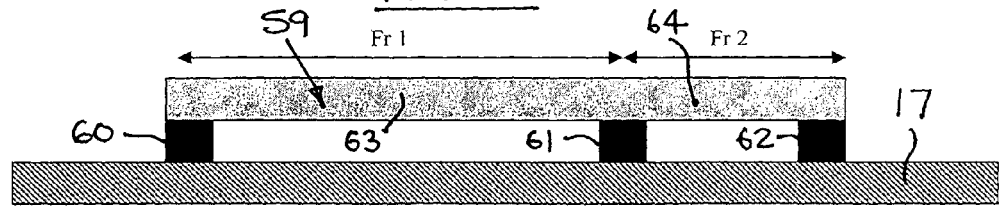

FIG. 9 shows a single body 59 which is secured to the backplate 17 at a three locations 60, 61 and 62. The portions 63 and 64 of body 59 between the supports are tuned to vibrate at two different first natural frequencies to target different vibration frequencies (or a range of frequencies) of the backplate.

Figure 10:
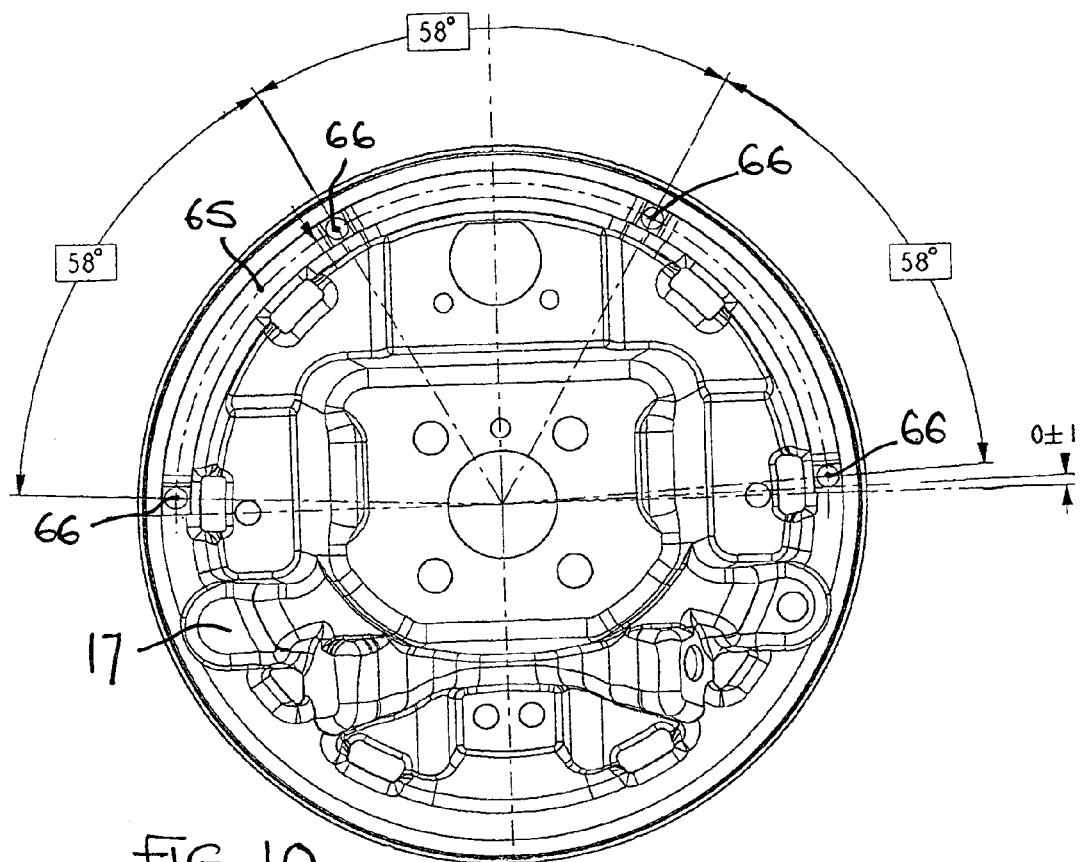
FIG. 10 is a plan view of a backplate with an alternative form of damper.
Figure 11:
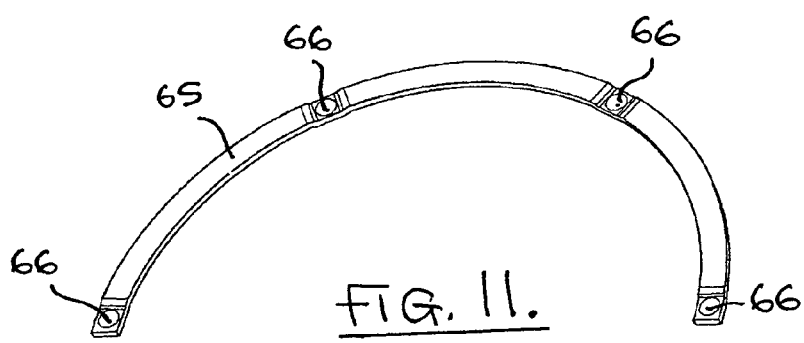
FIG. 11 shows a perspective view of the alternative damper.
Figure 12:
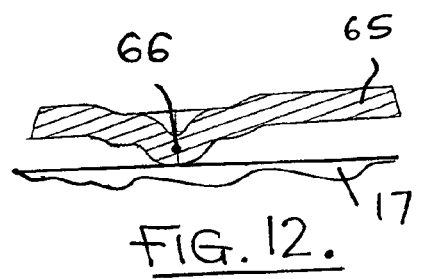
FIG. 12 shows details of a contact area of the damper with the backplate.

Also, the cross section of the damping mass may be, for example, of square or rectangular form. In an alternative design shown in FIGS. 10 to 12 the backplate 17 has a damping mass 65 which is made from flat strip material with a cross section of 9 mm×2.5 mm which extends for approximately 180 degrees and is fastened to the backplate at four locations 66 by spot welding. FIG. 6 shows the detail of the contact areas 66 of the damping mass which are pressed in the strip and which ensure that the damping mass is spaced from the backplate between the contact areas. This design of mass damper has four vibrating masses and was designed to a target frequency of 1200 Hz in the backplate. The effect of this design is similar to that of FIGS. 1 to 3 but it is more expensive to manufacture.

The invention claimed is:

1. A drum brake backplate having a single piece body vibration damping mass that is directly secured thereto, one or more portions of the single piece body vibration damping mass being directly secured to the backplate and a remainder of the vibration damping mass being spaced from the backplate and defining one or more further portions which are tuned to vibrate relative to the backplate at a frequency which reduces noise generated by one or more target frequencies of the backplate, wherein the single piece body vibration damping mass is secured to the backplate in a region surrounding an area of attachment of a hydraulic actuating cylinder, wherein the single piece body vibration damping mass is secured at at least one of its end regions to the backplate and is spaced apart from the backplate by a clearance between the end regions to vibrate relative to the backplate.

2. A backplate according to claim 1 in which the damping mass is secured at both its end regions to the backplate and is spaced from the backplate between the end regions to vibrate relative to the backplate and to target a single frequency of vibration of the backplate.

3. A backplate according to claim 1 in which the mass comprises an elongate rod or strip member of arcuate form which is secured to the backplate at one or more locations adjacent a rim of the backplate.

4. A backplate according to claim 1 in which the damping mass is secured to the backplate at one end thereof only and which constitutes a single vibrating mass which targets a single frequency of vibration of the backplate.

5. A backplate according to claim 1 in which the damping mass is secured to the backplate at two locations, one location at an end of the body and the other location between ends of the body.

6. A backplate according to claim 1 in which the damping mass is secured to the backplate at its ends and between the ends.

7. A backplate according to claim 1 in which more than one damping mass is provided.

8. A backplate according to claim 1 in which the damping mass is riveted, welded or glued to the backplate.

9. A drum brake provided with a backplate according to claim 1.

10. A backplate according to claim 1 wherein the damping mass has an arcuate shape and is positioned on the backplate such that the area of attachment of the hydraulic actuating cylinder is within the arc of the dampening mass.

11. A drum brake backplate having opposed first and second surfaces, the first surface having a single piece body vibration damping mass directly secured thereto in a region surrounding an area of attachment of the hydraulic actuating cylinder along the first surface, one or more portions of the vibration damping mass being secured to the backplate first surface and one or more further portions of the vibration damping mass spaced from the backplate first surface and which are tuned to vibrate relative to the backplate at a frequency which reduces noise, wherein the single piece body vibration damping mass is secured at at least one of its end regions to the backplate and is spaced from the backplate between the end regions by a clearance to vibrate relative to the backplate and to target a single frequency of vibration of the backplate.

\* \* \* \* \*